__United States Patent Office__

2,891,938
Patented June 23, 1959

2,891,938

CHROMIUM-CONTAINING MONOAZO DYESTUFFS

Guido Schetty, Basel, Switzerland, assignor to J. R. Geigy A.-G., Basel, Switzerland, a Swiss firm No Drawing. Application March 17, 1958
Serial No. 721,633

Claims priority, application Switzerland March 29, 1957

6 Claims. (Cl. 260—145)

The present invention concerns a process for the production of chromium-containing monoazo dyestuffs as well as the use thereof for the dyeing and printing of organic materials. It also comprises the new dyestuffs obtained according to this process and, as industrial product, the material dyed and printed therewith.

Complex heavy metal compounds of monoazo dyestuffs containing neither sulphonic acid groups nor carboxylic acid groups and in which the end component is a 1-acylamino-7-hydroxynaphthalene compound have already been described. The dyestuffs have been suggested for the dyeing of lacquers, synthetic polymers and similar substances. They are only suitable for the dyeing of wool or other animal fibres from an aqueous bath if they contain certain non-ionogenic groups which increase the water solubility. Up to now for example, alkyl sulphone groups and sulphonic acid amide groups have been used in complex chromium and cobalt compounds, it being advantageous that these groups be in the diazo components.

It has now been found that particularly fast to light chromium-containing dyestuffs which contain one chromium atom bound in complex linkage to two monoazo dyestuff molecules are obtained if agents giving off chromium are reacted with dyestuffs of the general formula:

(I)

wherein:

A represents a benzene radical bound to the azo group in o-position to the hydroxyl group, which contains at least one non-ionogenic, sulphur-free substituent, and B represents a 1-acylamino-7-hydroxynaphthalene radical having no ionogenic groups and bound in the 8-position to the azo group, in which the acyl group is the radical of a carboxylic acid of the benzene series, and the components are so chosen that in at least one of the two monoazo dyestuffs a radical containing sulphonyl groups is present in the acyl radical of the azo component.

The new dyestuffs dissolve in water. Even from a neutral bath they have a very good drawing power onto wool and other material having similar dyeing behaviour and they dye this material in the olive, green-grey to blue-grey shades which are in demand.

The two monoazo dyestuffs bound in complex linkage to the chromium atom contain two identical or different 1-acylamino-7-hydroxynaphthalene compounds as azo components. In the process according to the present invention by these are meant the 1-benzoylamino-7-hydroxynaphthalenes which may possibly contain non-ionogenic substituents in the benzene and naphthalene nuclei. As defined, at least one of the two dyestuffs contains a radical containing sulphonyl groups in the acyl radical of the azo component, which radical promotes the water solubility. This radical containing sulphonyl groups is advantageously low molecular, i.e. if it contains an organic radical this is preferably a low alkyl group. The most valuable dyestuffs are those in which the azo components contain methyl sulphonyl, ethyl sulphonyl, chloromethyl sulphonyl, isopropyl sulphonyl groups or sulphonic acid amino, sulphonic acid-N-methyl-, -N-ethyl-, -N.β-hydroxyethyl- or -N-dimethylamino groups in the benzoyl radicals. In general those dyestuffs are particularly valuable in which these solubility promoting radicals are in the m- or p-position to the carbonyl group and the benzene nuclei have at most other simple, non-ionogenic substituents such as halogen atoms, nitro groups and low molecular alkyl or alkoxy groups.

Examples of 1-acylamino-7-hydroxynaphthalenes containing sulphonyl groups are the following:

N-2'- or -3'- or -4'-methylsulphonyl-benzoyl-1-amino-7-hydroxynaphthalene, N-2'-, -3'- or -4'-ethylsulphonyl-benzoyl-1-amino-7-hydroxynaphthalene, N - 3' - isopropyl-sulphonyl-benzoyl-1-amino-7-hydroxynaphthalene, N-3'-n-butylsulphonyl-benzoyl-1-amino - 7 - hydroxynaphthalene, N-2'-methyl-5'-methylsulphonyl-benzoyl-1-amino - 7 - hydroxynaphthalene, N-3'-aminosulphonyl-benzoyl-1-amino-7-hydroxynaphthalene, N-3'- or N-4'-methylaminosulphonyl-benzoyl-1-amino - 7 - hydroxynaphthalene and N-(2'- or 3'- or 4'-N-dimethylaminosulphonyl-benzoyl)-1-amino-7-hydroxynaphthalene.

These compounds are obtained for example by condensing 1-amino-7-hydroxynaphthalene with those benzoyl halides which have a radical containing sulphonyl groups in the benzene nucleus. The reaction is performed advantageously in organic solvent at raised temperature with the addition of acid binding or catalytic agents such as, e.g. pyridine, dimethyl aniline or sodium carbonate. Sulphonic acid amido-benzoyl derivatives can also be obtained in the following manner: 1-amino-7-hydroxynaphthalene is reacted with benzoic acid sulphonic acid dihalides under such conditions that only the carbonyl chloride group reacts, the chlorosulphonyl-benzoylamino compound is then reacted with ammonia, primary or secondary amines. Any acyloxy groups which are also formed are saponified under mild conditions, for example with the help of alkali carbonates.

Ortho-amino-hydroxybenzene compounds containing at least one non-ionogenic sulphur-free substituent in the benzene nucleus according to the present invention are used as diazo components. They can be substituted in particular by halogen atoms and the nitro group. Particularly valuable dyestuffs are obtained with those 2-amino-1-hydroxybenzene compounds which contain a nitro group in the 4-position. Naturally also amino compounds having no sulphonyl and carboxyl groups and which contain instead of the hydroxyl group in the o-position, a substituent which is converted during the metallising reaction into a hydroxy group bound to the chromium atom, can be used as diazo components. Diazo components which can be used according to the present invention are, for example:

5-nitro- and also 6-nitro-2-amino-1-hydroxybenzene, 4.6-dinitro-2-amino-1-hydroxybenzene, 4- or 5-chloro-2-amino-1-hydroxybenzene, 4.6-dichloro - 2 - amino - 1 - hydroxybenzene and 3.4.6-trichloro-2-amino - 1 - hydroxybenzene, 4-methyl-6-nitro-2-amino-1-hydroxybenzene, 4-tert. amyl-6-nitro-2-amino-1-hydroxybenzene, 4-methyl- or -chloro- 5-nitro-2-amino-1-hydroxybenzene, 4-nitro-6-chloro- and 4-chloro-6-nitro-2-amino-1-hydroxybenzene, 4-cyano-2-amino-1-hydroxybenzene, 2-amino-1 - hydroxybenzene-4-methyl ketone, 2-amino-1-hydroxybenzene - 4-phenyl ketone and 2-amino-1-hydroxybenzene-4-carboxylic acid dimethyl amide, in particular however, 4-nitro-2-amino-1-hydroxybenzene.

The diazotisation of such o-aminohydroxybenzene compounds is known per se and they are coupled with the azo components usable according to the present invention also by the usual methods, i.e. in alkaline medium and possibly in the presence of tertiary nitrogen bases such as pyridine, lutidine, collidine, triethanolamine, dimethyl aniline or dimethyl formamide which accelerate the coupling reaction.

The complex chromium compounds are produced by reacting the monoazo dyestuffs usable according to the present invention with agents giving off chromium. The metallising methods which can be used are also known per se. Both inorganic as well as organic salts of chromium and also complex compounds of this metal are used as agents giving off chromium. On using salts of hexavalent chromium, the presence of a suitable reducing agent such as, for example, reducing sugar, is necessary. The choice of chroming agent depends chiefly on the conditions under which the metallisation is performed. On chroming in an alkaline medium, advantageously complex chromium compounds which are stable to alkali such as, for example the alkali metal salts of disalicylato chromic acid are used. Naturally, economic factors are to be taken into consideration when choosing the chroming agent. The metallisation is performed advantageously in aqueous medium but if necessary it can also be performed in organic or aqueous/organic medium or in the melt of salts of low molecular fatty acids. The chroming is performed advantageously in the warm and in weakly acid to alkaline medium, somewhat more than a half molecule of chromium salt or a half equivalent of a complex chromium compound being reacted with one dyestuff molecule. In the dyestuffs obtained of the type:

(monoazo dyestuff-chromium-monoazo dyestuff)

two identical or different monoazo dyestuffs are bound to the chromium atom. The former are compounds having a radical containing sulphonyl groups in each benzoyl group of the azo component and thus most of them have good water solubility. As defined, the second type of dyestuffs can only contain such a water solubility promoting substituent in one of these two groups. When combining two different monoazo dyestuffs, the drawing power can be influenced within certain limits and also the solubility can be influenced in the desired direction by a suitable choice. Such "mixed chromium complexes" are produced by chroming the mixture of the two dyestuffs under the conditions which have been described above. A preferred method for the production of mixed chromium complex dyestuffs according to the present invention consists in coupling one mol of a diazo component with a half a mol of each of two different azo components and then chroming the dyestuff mixture. Apart from the method mentioned it is also possible to chrome one of the two monoazo dyestuffs choosing conditions that one dyestuff molecule contains one chromium atom bound in complex linkage, and then to react one mol of this 1:1 chromium complex with one mol of the other, metal-free dyestuff. According to experience, 1:1 chromium complexes are obtained from the metal-free monoazo dyestuffs in acid, aqueous-organic medium at a raised temperature with an excess of a salt of trivalent chromium, for example chromic acetate, chromic fluoride or chromic formiate. The reaction of the 1:1 chromium complex with the metal-free dyestuff is performed advantageously in neutral to alkaline, aqueous medium at usual or raised temperature. Although this production method by way of the 1:1 complex is rather more involved, it enables the production of particularly uniform dyestuffs.

The new chromium-containing azo dyestuffs correspond to the general formula:

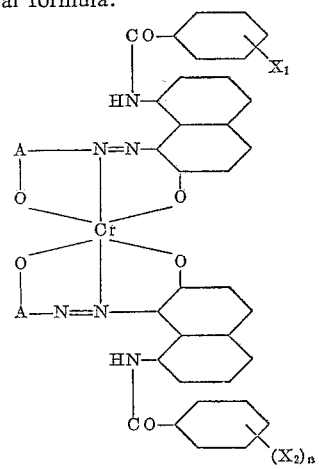

wherein:

A represents a substituted benzene radical containing the metallised group in o-position to the azo group, the substituents being chosen from the class consisting of chlorine atoms, nitro and lower alkyl groups, $X_1$ and $X_2$ each represents a member selected from the group consisting of alkylsulphonyl and sulphonic acid amide groups, and $n$ is one of the integers 0 and 1.

For dyeing animal fibres from an aqueous bath, the chromium complexes according to the present invention are used advantageously in the form of their alkali metal salts, for example the lithium, potassium and sodium salts and also, however, in the form of the ammonium salts. If necessary also salts having a basic reaction as well as anion active wetting and dispersing agents are mixed with them. The new dyestuffs dye materials of animal origin such as wool, silk, and leather from a weakly alkaline, neutral to weakly acid bath in olive, green-grey to blue-grey shades. The dyeings are distinguished not only by their excellent fastness to light in particular, but also by their good wet fastness properties and their evenness. The dyestuffs can also be used for the dyeing and printing of other material such as synthetic fibres made from superpolyamides and superpolyurethanes. Some of them are also suitable for the dyeing of natural and synthetic lacquers, for example those based on nitro or acetyl cellulose. For this purpose chiefly the dyestuffs having slight water solubility are used.

The following examples illustrate the invention. Where not otherwise stated the temperatures are given in degrees centigrade and parts are given as parts by weight. The relationship of parts by weight to parts by volume is as that of kilogrammes to litres.

EXAMPLE 1

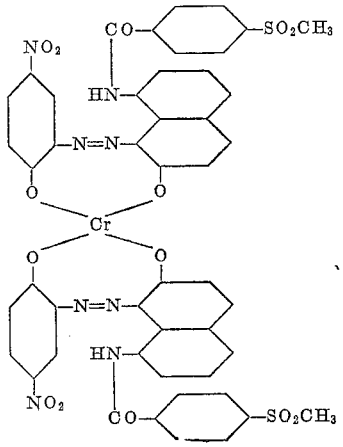

15.4 parts of 4-nitro-2-amino-1-hydroxybenzene in 100 parts of water and 17 parts of concentrated hydrochloric acid are diazotised with 6.9 parts of sodium nitrite, the diazo compound is neutralised with sodium bicarbonate and then poured at 0–3° into a solution of 35.8 parts of N-4'-methylsulphonyl-benzoyl-1-amino-7-hydroxynaphthalene, 10.5 parts by volume of 10 N-caustic soda lye and 15 parts of sodium carbonate in 300 parts of water. On completion of the dyestuff formation, it is filtered off and washed with diluted sodium chloride solution. The damp dyestuff paste is heated in 500 parts of formamide with 12 parts of chromic acetate (corresponding to 3.12 parts of chromium) at 100–105° until the starting dyestuff has disappeared. The metal-containing compound is then poured into 2000 parts of water, enough hydrochloric acid is added to just turn Congo red paper blue and then the dyestuff which has precipitated is filtered off. After it has been washed thoroughly with water, the dyestuff is stirred in 300 parts of water, the reaction is made alkaline by the addition of caustic soda lye, sodium chloride is added and the dyestuff is filtered off. After drying, the chromium-containing dyestuff is a dark powder which dissolves in hot water and which dyes wool from a weakly acid or neutral bath in green olive shades which have very good fastness properties, in particular very good fastness to light.

Dyestuffs having similar properties are obtained if the N-4'-methylsulphonyl-benzoyl-1-amino-7-hydroxynaphthalene is replaced by 37.3 parts of N-4'-ethylsulphonyl-benzoyl-1-amino-7-hydroxynaphthalene or by 38.5 parts of N-4'-isopropylsulphonyl-benzoyl-1-amino-7-hydroxynaphthalene.

EXAMPLE 2

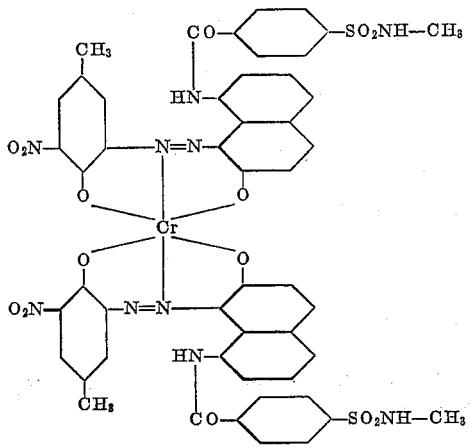

16.8 parts of 6-nitro-4-methyl-2-amino-1-hydroxybenzene are dissolved hot in 100 parts of water with 17 parts of concentrated hydrochloric acid and, after cooling to 3°, diazotised with 20 parts by volume of a 5 N-sodium nitrite solution. After neutralising with sodium bicarbonate, the paste of the diazo compound is poured into a solution of 37.4 parts of N-4'-sulphonic acid methylamido-benzoyl-1-amino-7-hydroxynaphthalene, 4.2 parts of sodium hydroxide and 15 parts of sodium carbonate in 250 parts of water. The whole is stirred at 5–10° until the dyestuff formation is complete, the dyestuff is precipitated by the addition of sodium chloride, filtered off and chromed as described in Example 1. In this way, a blue-black powder is obtained which dyes wool from an acetic acid bath in very fast to light, washing and milling blue-grey shades.

A dyestuff having similar properties is obtained if the N-4'-sulphonic acid methylamido-benzoyl-1-amino-7-hydroxynaphthalene is replaced by 38.6 parts of N-4'-sulphonic acid ethylamido-1-amino-7-hydroxynaphthalene.

EXAMPLE 3

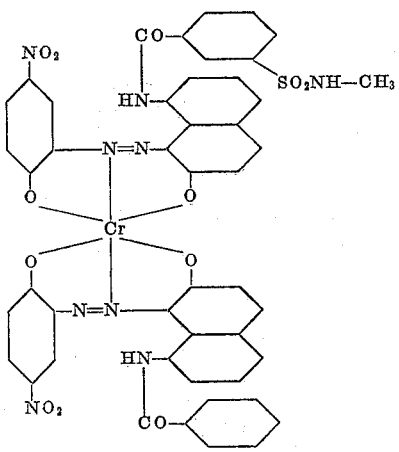

15.4 parts of 4-nitro-2-amino-1-hydroxybenzene are diazotised as described in Example 1, neutralised, and poured into a solution of 18.7 parts of N-3'-sulphonic acid-methylamido-benzoyl-1-amino-7-hydroxynaphthalene, 13.8 parts of N-benzoylamino-7-hydroxynaphthalene, 4.3 parts of sodium hydroxide and 12 parts of sodium carbonate in 400 parts of water. On completion of the dyestuff formation, sodium chloride is added and the mixed monoazo dyestuff is filtered off and washed with diluted sodium chloride solution. The filtered residue is then stirred into 1000 parts of water, 140 parts of a solution of the sodium salt of disalicylato chromic acid (corresponding to 3 parts of chromium) are added and the whole is boiled for 24 hours. 100 parts of sodium chloride are then added and the dyestuff is filtered off hot. After drying, the dyestuff is a green-black powder which dyes wool from a weakly acid or neutral bath in green-olive shades which have excellent fastness to light and very good fastness to milling.

The following table contains further similar chromium-containing dyestuffs which can be obtained from the components given by the methods described in the above examples.

Table

| No. | diazo component | coupling component | colour of chromium complex on wool |
|---|---|---|---|
| 1 | 5-nitro-2-amino-1-hydroxybenzene. | N-3'-methylsulphonyl-benzoyl-1-amino-7-hydroxynaphthalene. | greenish-grey. |
| 2 | do | N-4'-methylsulphonyl-benzoyl-1-amino-7-hydroxynaphthalene. | Do. |
| 3 | 4-chloro-6-nitro-2-amino-1-hydroxybenzene. | N-3'-sulphonic acid methylamido-benzoyl-1-amino-7-hydroxynaphthalene. | grey. |
| 4 | 4-chloro-2-amino-1-hydroxybenzene. | do | blue-grey. |
| 5 | do | N-4'-sulphonic acid dimethylamido-benzoyl-1-amino-7-hydroxynaphthalene. | greenish-olive. |
| 6 | 6-methyl-4-nitro-2-amino-1-hydroxybenzene. | do | olive. |
| 7 | 4,6-dichloro-2-amino-1-hydroxybenzene. | N-4'-sulphonic acid methyl-amido-benzoyl-1-amino-7-hydroxy-naphthalene. | blue-grey. |
| 8 | 4-chloro-2-amino-1-hydroxybenzene. | N-2'-methylsulphonyl-benzoyl-1-amino-7-hydroxynaphthalene. | Do. |
| 9 | 6-nitro-4-isoamyl-2-amino-1-hydroxybenzene. | N-3'-sulphonic acid methyl-amido-benzoyl-1-amino-7-hydroxy-naphthalene. | Do. |

What I claim is:
1. The complex chromium compound corresponding to the general formula:

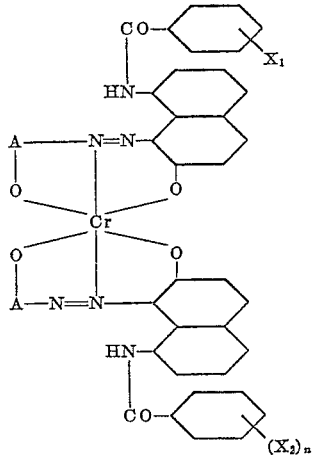

wherein:

A represents a substituted benzene radical containing the metallised group in o-position to the azo group, the substituents being chosen from the class consisting of chlorine atoms, nitro and lower alkyl groups, $X_1$ and $X_2$ each represents a member selected from the group consisting of alkylsulphonyl and sulphonic acid amide groups, $n$ is one of the integers 0 and 1.

2. The complex chromium compound corresponding to the general formula:

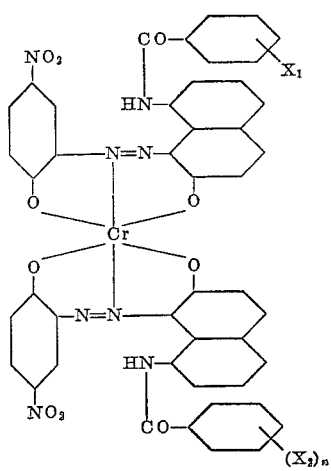

wherein:

$X_1$ and $X_2$ each represents a member selected from the group consisting of alkylsulphonyl and sulphonic acid amide groups, and $n$ is one of the integers 0 and 1.

3. The complex chromium compound corresponding to the formula:

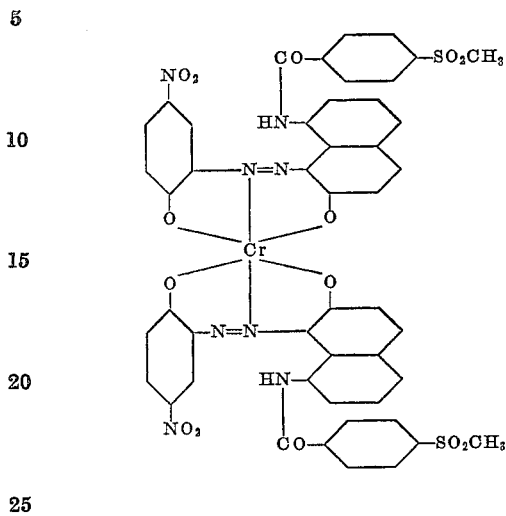

4. The complex chromium compound corresponding to the formula:

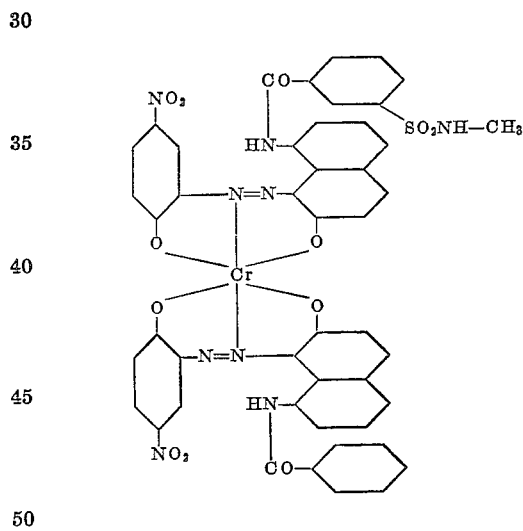

5. The complex chromium compound corresponding to the formula:

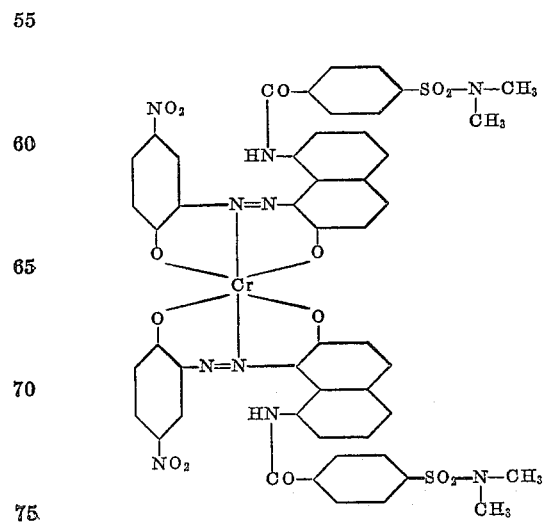

6. The complex chromium compound corresponding to the formula:
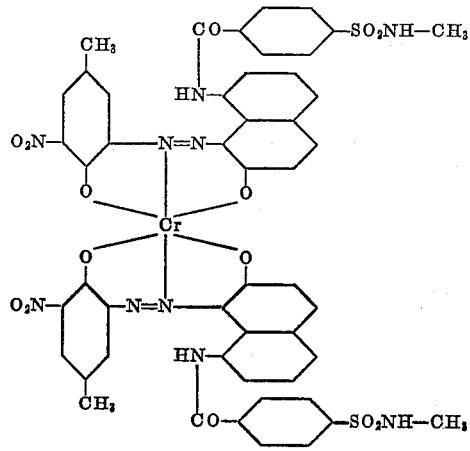
References Cited in the file of this patent
UNITED STATES PATENTS
| | | |
|---|---|---|
| 2,610,175 | Widmer et al. | Sept. 9, 1952 |
| 2,756,223 | Schetty | July 24, 1956 |
| 2,766,230 | Buehler et al. | Oct. 9, 1956 |
FOREIGN PATENTS
| | | |
|---|---|---|
| 308,400 | Switzerland | Sept. 16, 1955 |
| 755,113 | Great Britain | Aug. 15, 1956 |